United States Patent

Kawaguchi et al.

Patent Number: 5,283,220
Date of Patent: Feb. 1, 1994

[54] REVERSIBLE THERMOSENSITIVE RECORDING MATERIAL

[75] Inventors: Makoto Kawaguchi, Shizuoka; Yoshihiko Hotta, Mishima; Yukio Konagaya, Shimizu; Kunichika Morohoshi; Toru Nogiwa, both of Numazu; Akira Suzuki, Mishima; Fumihito Masubuchi, Numazu; Atsushi Kutami, Numazu; Tetsuya Amano, Numazu, all of Japan

[73] Assignee: Ricoh Company, Ltd., Tokyo, Japan

[21] Appl. No.: 888,658

[22] Filed: May 27, 1992

[30] Foreign Application Priority Data

May 27, 1991 [JP] Japan .................. 3-151060
Aug. 30, 1991 [JP] Japan .................. 3-245012
May 20, 1992 [JP] Japan .................. 4-154547

[51] Int. Cl.⁵ .................. B41M 5/28
[52] U.S. Cl. .................. 503/200; 503/201; 503/217; 503/225; 503/226
[58] Field of Search .............. 503/200, 208, 214, 217, 503/216, 226

[56] References Cited

U.S. PATENT DOCUMENTS 5,087,601  2/1992  Hotta et al. .................. 503/226

FOREIGN PATENT DOCUMENTS 3933487  4/1990  Fed. Rep. of Germany .
4019683  1/1991  Fed. Rep. of Germany .

Primary Examiner—Pamela R. Schwartz
Attorney, Agent, or Firm—Oblon, Spivak, McClelland, Maier & Neustadt

[57] ABSTRACT

A reversible thermosensitive recording material is composed of a support and a reversible thermosensitive recording layer formed thereon. The reversible thermosensitive recording layer is composed of a matrix resin, such as polyvinyl chloride or vinyl chloride copolymer, and an organic low-molecular-weight material dispersed in the form of finely-divided particles in the matrix resin, with the weight percentage Y of the vinyl chloride repeat in the matrix resin and the average polymerization degree X of the matrix resin satisfying the relationship:

$$-0.68 \log X + 3.794 \leq \log Y \leq -0.215 \log X + 2.66.$$

8 Claims, 2 Drawing Sheets

A-A  LOG Y = -0.68 LOG X + 3.794
B-B  LOG Y = -0.215 LOG X + 2.66
C-C  LOG Y = -0.215 LOG X + 2.636
D-D  LOG Y = -0.215 LOG X + 2.49

REVERSIBLE THERMOSENSITIVE RECORDING MATERIAL

BACKGROUND OF THE INVENTION

1. Field of the Invention

The present invention relates to a reversible thermosensitive recording material capable of recording and erasing images repeatedly by utilizing the property of reversibly changing the transparency from a transparent state to an opaque state, and vice versa, depending upon the temperature thereof.

2. Discussion of Background

Recently attention has been paid to a reversible thermosensitive recording material capable of temporarily recording images thereon and erasing the same therefrom when such images become unnecessary. As representative examples of this kind of reversible thermosensitive recording material, there are conventionally known reversible thermosensitive recording materials in which an organic low-molecular-weight material such as a higher fatty acid is dispersed in a matrix resin such as vinyl chloride—vinyl acetate copolymer, as disclosed in Japanese Laid-Open Patent Applications 54-119377 and 55-154198.

The conventional resin employed in the above reversible thermosensitive recording material has poor heat resistance since the content of the vinyl chloride repeat unit is about 80 to 91 wt. %, and the average polymerization degree thereof is about 400.

In the case where only heat energy is applied to the reversible thermosensitive recording material by using a heat-application roller or a heat-pen, with application of slight pressure thereto, in order to perform recording and erasing operations, the durability of the recording material is not a problem even when the image formation and erasure are repeated. However, when both heat and pressure are applied to the recording material at the same time, for instance, by using a thermal head, the durability of the recording material becomes a problem during the repeated image formation and erasing operations. This is because the matrix resin has poor heat resistance. More specifically, the matrix resin around the particles of the organic low-molecular-weight material in the recording layer is deformed and the particle size of the organic low-molecular-weight material dispersed in the matrix resin is increased during the course of the repeated recording and erasing operations. As a result, the light scattering effect of the recording layer is decreased. As a matter of course, the degree of whiteness of a white opaque portion in the recording layer is also significantly decreased. In the end, the image contrast is disadvantageously lowered.

SUMMARY OF THE INVENTION

It is therefore an object of the present invention to provide a reversible thermosensitive recording material wherein the transparency can be changed reversibly from a transparent state to an opaque state, and vice versa, depending upon the temperature thereof, which is free from the above-mentioned conventional defects, with improved durability, and a minimum decrease in whiteness when the image formation and erasure are repeated even with the simultaneous application of heat and pressure to the reversible thermosensitive recording material.

This object of the present invention can be achieved by a reversible thermosensitive recording material comprising a support and a reversible thermosensitive recording layer formed thereon, which comprises (a) a matrix resin selected from the group consisting of polyvinyl chloride and vinyl chloride copolymer, and (b) an organic low-molecular-weight material dispersed in the form of finely-divided particles in the matrix resin, with the weight percentage Y of the vinyl chloride repeat in the matrix resin and the average polymerization degree X of the matrix resin having the following relationship:

$$-0.68 \log X + 3.794 \leq \log Y \leq -0.215 \log X + 2.66.$$

In the above, the average polymerization degree X is preferably 500 or more.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The thermosensitive recording material of the present invention comprises a support and a reversible thermosensitive recording layer formed thereon, which comprises (a) a matrix resin selected from the group consisting of polyvinyl chloride and vinyl chloride copolymer, and (b) an organic low-molecular-weight material dispersed in the matrix resin, with the weight percentage Y of the vinyl chloride repeat unit in the matrix resin and the average polymerization degree X of the matrix resin satisfying the following relationship:

$$-0.68 \log X + 3.794 \leq \log Y \leq -0.215 \log X + 2.66.$$

This thermosensitive recording material has the following advantages: (a) the matrix resin has an improved heat resistance so that the matrix resin shows little deformation even when heat and pressure are simultaneously applied, for instance, by a thermal head; and (b) the organic low-molecular-weight material dispersed in the matrix resin can be maintained in the form of finely-divided particles in the matrix resin even when heat is applied repeatedly.

Thus the thermosensitive recording material can attain high image contrast in the course of the changes of the transparency of the recording layer from a transparent state to a white opaque state, and vice versa.

As mentioned above, in the present invention, the weight percentage Y of the vinyl chloride repeat unit in the matrix resin and the average polymerization degree X of the matrix resin satisfy the following formula:

$$-0.68 \log X + 3.794 \leq \log Y \leq -0.215 \log X + 2.66.$$

Figure 2:
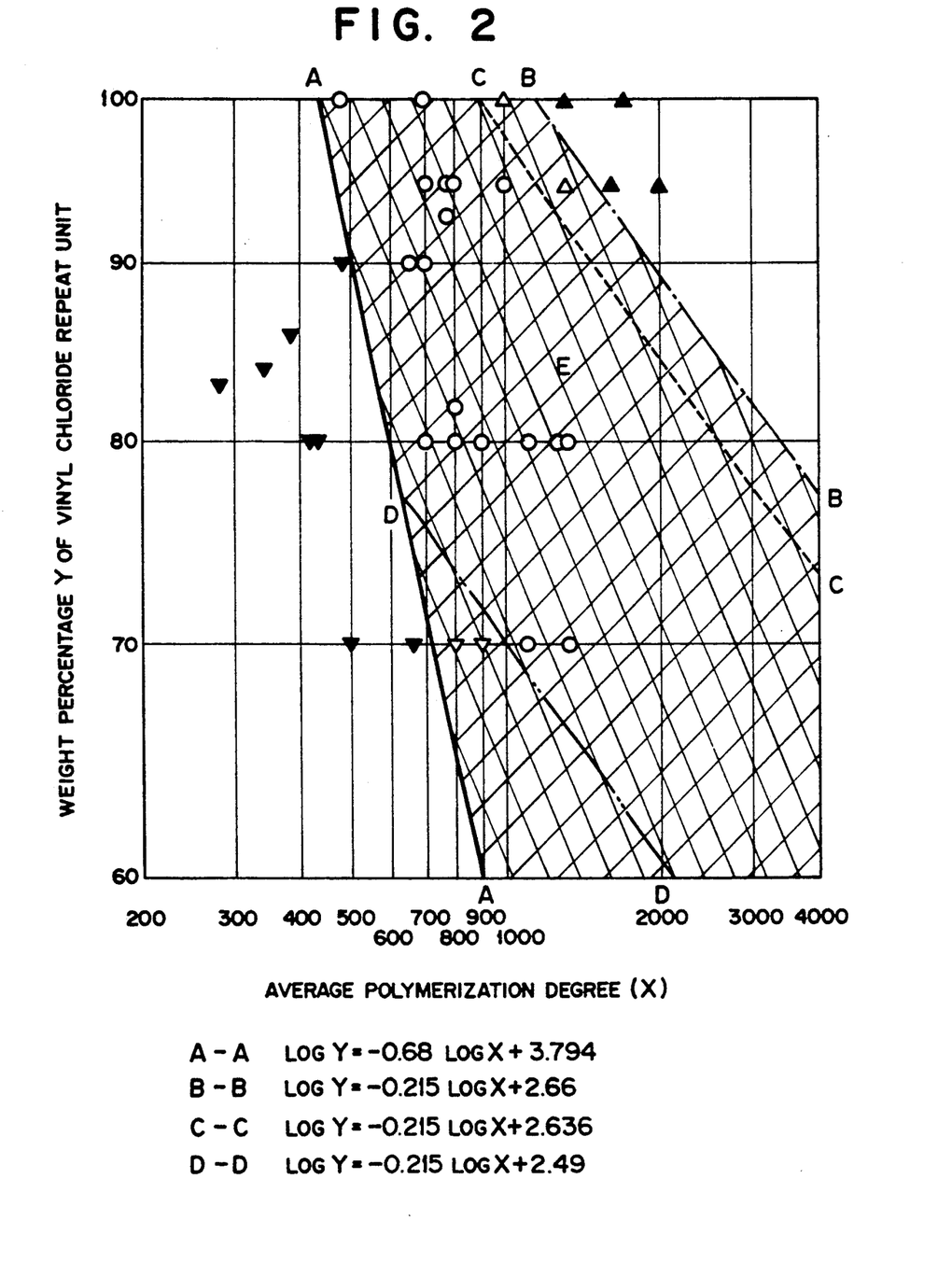
FIG. 2 is a diagram in explanation of the relationship between the log X and log Y of the matrix resins for use in the present invention, in which X represents the average polymerization degree of the matrix resin and Y represents the weight percentage of the vinyl chloride repeat unit in the matrix resin.

The area indicated by the above formula is the area between the solid lines A—A and B—B in FIG. 2.

Furthermore, it is more preferable that the weight percentage Y of the vinyl chloride repeat unit in the matrix resin and the average polymerization degree X of the matrix resin be in the range E where the range indicated by the above relationship and the range indicated by the following formula overlap:

$$-0.215 \log X + 2.49 \leq \log Y \leq -0.215 \log X + 2.636.$$

The area indicated by the above formula is the area between the broken lines C—C and D—D in FIG. 2.

Generally, the average polymerization degree of the resin matrix for use in the present invention is 500 or more. A preferable average polymerization degree of the resin is 600 or more, and a more preferable average polymerization degree thereof is 700 or more.

The reasons why the durability of the reversible thermosensitive recording material is improved by the use of the above-mentioned particular polyvinyl chloride or vinyl chloride copolymer when used repeatedly for image formation and erasing with application of heat, for instance, by a thermal head have not yet been clarified, but it is considered that as the average polymerization degree X of the matrix resin or the weight percentage Y of the vinyl chloride repeat unit is increased, the melt viscosity of the matrix resin increases, so that the resin matrix around the finely-divided particles of the organic low-molecular weight material is less deformed, and the organic low-molecular weight material is maintained in the form of finely-divided particles. Thus the durability of the reversible thermosensitive recording material is improved.

When the average polymerization degree X of the matrix resin or the weight percentage Y of the vinyl chloride repeat unit is excessively increased, the solubility of the matrix resin in the solvent for dispersing the organic low-molecular weight material is decreased, so that it becomes difficult to appropriately disperse the organic low-molecular weight material in the form of finely-divided particles in the matrix resin. Accordingly, it becomes difficult to obtain an appropriate white opaque state.

In the case where $\log Y < -0.68 \log X + 3.794$, the durability of the recording material when used repeatedly for image formation and erasing is decreased, while when $\log Y > -0.215 \log X + 2.66$, the degree of the initial white opaqueness is lowered.

The polyvinyl chloride and vinyl chloride copolymer for the matrix resin are usually prepared by bulk polymerization, emulsion polymerization, suspension polymerization, or modified methods of these polymerizations.

In suspension polymerization, vinyl chloride monomer is dispersed and suspended to form small particles of the vinyl monomer in a water phase containing a small amount of a hydrophilic protective colloidal dispersant by vigorously stirring the dispersion with application of intense shearing force. Radical polymerization is carried out in each particle of the vinyl chloride monomer by use of an organic peroxide, which is soluble in the monomer, as a polymerization initiator to obtain a polymer slurry with particle diameters of several tens to several hundreds $\mu m$. The thus obtained polymer slurry is then filtered off, washed, dried and sieved, whereby polyvinyl chloride is obtained.

Suspension polymerization is one of the most popular methods for producing polyvinyl chloride resin at present because of the following advantages over other methods: The polymer obtained by suspension polymerization contains almost no impurities so that the quality of the polymer is excellent. The reaction temperature during the suspension polymerization can be easily controlled. The cost of the production facilities and the production costs are low. Production control is so easy that the uniformity of the product quality can be easily maintained.

In emulsion polymerization, the vinyl chloride monomer is emulsified and dispersed in a water phase using an anionic surface active agent serving as emulsifying agent. Then a polymer latex with a particle diameter of 0.1 to several $\mu m$ is obtained using a water-soluble polymerization initiator such as persulfate. The thus obtained polymer latex is salted out, filtered off, washed, dried and pulverized, whereby polyvinyl chloride is obtained. Alternatively, polyvinyl chloride can be obtained by spraying the polymer latex on a substrate and drying the sprayed polymer latex.

The polymer obtained by emulsion polymerization is in the form of finely-divided particles and is difficult to handle. Moreover, the polymer contains a large amount of impurities such as the emulsifying agent and the like. The hygroscopicity, thermal stability, transparency, and electrical insulating properties of the polymer are poor.

Bulk polymerization can be regarded as a separating-out type solution polymerization using the monomer as a solvent (precipitation polymerization). Radical polymerization is carried out by adding to the monomer a polymerization initiator which is soluble in the monomer. The polymerization reaction is terminated at an appropriate reaction ratio, and unreacted monomer is separated from the reaction mixture to recover the unreacted monomer. The thus obtained polymer is pulverized and classified, whereby polyvinyl chloride is obtained.

The purity of the polymer obtained by bulk polymerization is high because neither a dispersant nor an emulsifying agent is contained in the polymer. It is not necessary to filter off or dry the polymer because no water is used in the reaction process, so that the production equipment is simple and the production costs are low. However, the industrialization of bulk polymerization has been delayed because the elimination of reaction heat and the adjustment of the particle shape are difficult. However, an improved two-stage bulk polymerization method has been developed because of recent reactor improvements.

For the preparation of the vinyl chloride copolymer, a mixture of a counterpart monomer and vinyl chloride may be subjected to polymerization, or the polymerization may be conducted as the counterpart monomer is gradually added to vinyl chloride in the course of the polymerization.

Suspension polymerization is suitable for the above polymerization. The average polymerization degree can be controlled as desired by adjusting the temperature for polymerization. The polymerization degree can be increased by conducting the polymerization at a low temperature for an extended period of time. The weight percentage Y of the vinyl chloride repeat unit is almost determined by the initial mixing ratio of vinyl chloride to the counterpart monomer.

The number average molecular weight and the molecular weight distribution of the matrix resin can be obtained by Gel Penetration Chromatography (GPC).

In GPC, a resin sample solution consisting of the resin dissolved in a developing solvent is injected into a column packed with a granular gel containing pores. Resin fractions with molecular sizes larger than the sizes of the pores of the gel cannot enter the gel and pass over the granular gel through the column, while resin fractions with molecular sizes smaller than the sizes of the pores stay in the gel for a length of time depending upon the molecular size of the resin fraction. The larger the molecular size, the longer the residence time in the column.

The resin fractions are successively separated in the order of higher polymers to lower polymers (higher polymers first, and the lower polymers later). The difference between the refractive index of the eluate and that of the developing solvent employed for dissolving the resin, that is, the differential refractive index, is measured, and the average molecular weight and the molecular weight distribution are obtained from the differential refractive index measured and a calibration curve of reference samples with known molecular weights.

The average polymerization degree X is calculated from the above measured number average molecular weight ($\overline{M}n$) as follows:

*Average polymerization degree*
$$(X) = \overline{M}n / (V_C M \times Y + V_D M \times Y_D + V_E M \times Y_E)$$

wherein $V_C M$ is the molecular weight of vinyl chloride repeat unit;

$V_D M$ is the molecular weight of a counterpart monomer unit $V_D$ for the vinyl chloride repeat unit;

$V_E M$ is the molecular weight of another counterpart monomer unit $V_E$, if any, for the vinyl chloride repeat unit;

Y is the weight percentage of vinyl chloride repeat unit in the entire weight of the resin;

$Y_D$ is the weight percentage of the monomer repeat unit $V_D$ in the entire weight of the resin; and $Y_E$ is the weight percentage of another monomer repeat unit $V_E$, if any, in the entire weight of the resin.

In the above formula, $V_D$ and $V_E$ are not specific monomers. In the case where the matrix resin is vinyl chloride—vinyl acetate copolymer, $V_D$ represents the vinyl acetate monomer, and there is no $V_E$. The above formula is for the calculation of the average polymerization degree of a tercopolymer. However, with respect to a tetracopolymer, a similar calculation to the above can be applied.

The molecular weight of monomer repeat unit is defined as follows:

The vinyl chloride monomer unit is $-(CH_2-CHCl)-$, and the molecular weight of this monomer unit is calculated to be 63 from this formula. Examples of other monomer units are vinyl acetate $-(CH_2-CHCOOH)-$ (M.W. 72), vinyl alcohol $-(CH_2-CHOH)-$ (M.W. 44), maleic acid $-(CHCOOH-CHCOOH)-$ (M.W. 116), and vinylidene chloride $-(CH_2-CCl_2)-$ (M.W. 98).

The reversible thermosensitive recording material of the present invention can be switched from a transparent state to a milky white opaque state, and vice versa, depending on the temperature thereof. The difference between the transparent state and the milky white opaque state of the recording material is considered to be based on the following principle:

(i) In the transparent state, the organic low-molecular-weight material dispersed in the matrix resin consists of relatively large crystals, so that the light which enters the crystals from one side passes therethrough to the opposite side, without being scattered, thus the reversible thermosensitive recording material appears transparent.

(ii) In the milky white opaque state, the organic low-molecular-weight material is composed of polycrystals consisting of numerous small crystals, with the crystallographic axes pointed to various directions, so that the light which enters the recording layer is scattered a number of times at the interfaces of the crystals of the low-molecular-weight material. As a result, the thermosensitive recording layer becomes opaque in a milky white color.

The transition of the state of the reversible thermosensitive recording layer depending on the temperature thereof will now be explained by referring to FIG. 1.

Figure 1:
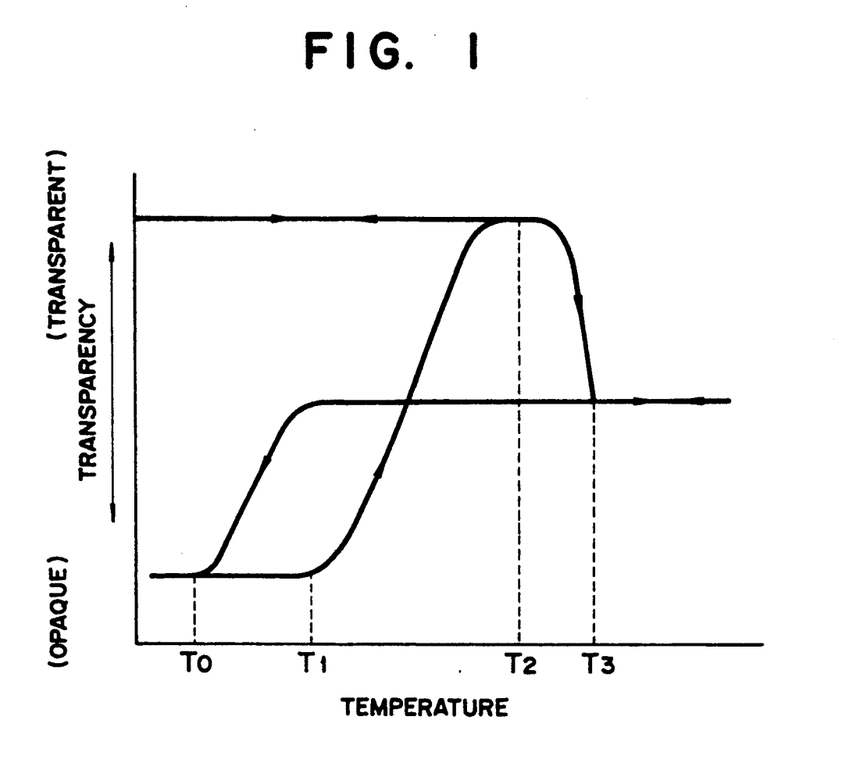
FIG. 1 is a diagram in explanation of the principle of formation and erasure of images in a reversible thermosensitive recording material of the present invention.

In FIG. 1, it is supposed that the reversible thermosensitive recording material comprising a matrix resin and a low-molecular-weight material dispersed in the matrix resin is initially in a milky white opaque state at room temperature $T_0$ or below. When the recording material is heated to temperature $T_2$, the recording material becomes transparent. Thus, the recording material reaches a maximum transparent state at temperature $T_2$ Even if the recording material which is already in the maximum transparent state is cooled to room temperature $T_0$ or below, the maximum transparent state is maintained. It is considered that this is because the organic low-molecular-weight material changes its state from a polycrystalline state to a single crystalline state via a semi-melted state during the above-mentioned heating and cooling steps.

When the recording material in the maximum transparent state is further heated to temperature $T_3$ or more, it assumes a medium state which is between the maximum transparent state and the maximum milky white opaque state. When the recording material in the medium state at temperature $T_3$ or more is cooled to room temperature $T_0$ or below, the recording material returns to the original maximum opaque state, without passing through any transparent state. It is considered that this is because the organic low-molecular-weight material is melted when heated to temperature $T_3$ or above, and the polycrystals of the organic low-molecular-weight material grow and separate out when it is cooled. If the recording material in the milky white opaque state is heated to any temperature between temperature $T_1$ and temperature $T_2$, and then cooled to the room temperature $T_0$ or below, the recording material assumes an intermediate state between the transparent state and the milky white opaque state.

When the recording material in the transparent state at room temperature $T_0$ is again heated to temperature $T_3$ or above, and then cooled to room temperature $T_0$, the recording material returns to the milky white opaque state. Thus, the reversible thermosensitive recording material according to the present invention can assume a milky white maximum opaque state, a maximum transparent state and an intermediate state between the aforementioned two states at room temperature.

Therefore, a milky white opaque image can be obtained on a transparent background, or a transparent image can also be obtained on a milky white opaque background by selectively applying the thermal energy to the reversible thermosensitive recording material according to the present invention. Further, such image formation and erasure can be repeated many times.

When a colored sheet is placed behind the reversible thermosensitive recording layer of the recording material, the colored image can be obtained on the white opaque background or the white opaque image can be obtained on the colored background.

In the case where the reversible thermosensitive recording material of the present invention is projected using an OHP (Over Head Projector), a milky white opaque portion in the recording material appears dark and a transparent portion in the recording material, through which the light passes becomes a bright portion on the screen.

To record the image on the reversible thermosensitive recording material of the present invention and erase it therefrom, two thermal heads, one for image formation and the other for the image erasure, may be used.

Alternatively, a single thermal head is available if the conditions for applying the heat energy to the recording material can be changed depending on the recording operation and the erasing operation.

In the case where two thermal heads are used, a device for applying the heat energy to the recording material is expensive, however, the image formation and erasure can easily be performed by once causing the recording material to pass through the two thermal heads from which the different heat energy is separately applied to the recording material corresponding to the image formation and image erasure. On the other hand, in the case where a single thermal head is used for both image formation and erasure, the cost of the above-mentioned device is low, but the operation becomes complicated. More specifically, it is necessary to delicately change the heat application conditions of the single thermal head corresponding to a portion where an image is to be recorded or erased while the recording material is caused to pass through the single thermal head at one operation. Or the images are erased by applying the thermal energy for image erasure to the recording material while the recording material is first caused to pass through the single thermal head. Then, when the recording material is caused to reversibly pass through the single thermal head, the images are recorded by the application of the thermal energy for image formation to the recording material.

To form the reversible thermosensitive recording layer on the support, (1) a solution in which both the matrix resin and the organic low-molecular-weight material are dissolved, or (2) a dispersion prepared by dispersing the finely-divided particles of the organic low-molecular-weight material in a matrix resin solution may be coated on the support such as a plastic film or a glass plate, then dried, so that the reversible thermosensitive recording layer can be formed on the support. The aforementioned matrix resin dispersion of the low-molecular-weight material (2) employs a solvent in which at least one of the low-molecular-weight materials can not be dissolved.

The solvent used for the formation of the thermosensitive recording layer can be selected depending on the kind of the matrix resin and the type of the organic low-molecular-weight material to be employed. For example, the solvents such as tetrahydrofuran, methyl ethyl ketone, methyl isobutyl ketone, chloroform, carbon tetrachloride, ethanol, toluene and benzene can be employed. Not only when a matrix resin dispersion is used, but also when a matrix resin solution is used, the organic low-molecular-weight material is separated in the form of finely-divided particles in the matrix resin of the thermosensitive recording layer.

The organic low-molecular-weight material for use in the reversible thermosensitive recording layer may be appropriately selected from the materials which are changeable from the polycrystalline state to the single crystalline state in accordance with each of the desired temperatures ranging from $T_0$ to $T_3$ as shown in FIG. 1. It is preferable that the organic low-molecular-weight material for use in the present invention have a melting point ranging from 30° to 200° C., more preferably from about 50° to 150° C.

Examples of the organic low-molecular-weight material for use in the present invention are alkanols; alkane diols; halogenated alkanols or halogenated alkane diols; alkylamines; alkanes; alkenes; alkynes; halogenated alkanes; halogenated alkenes; halogenated alkynes; cycloalkanes; cycloalkenes; cycloalkynes; saturated or unsaturated monocarboxylic acids, or saturated or unsaturated dicarboxylic acids, and esters, amides and ammonium salts thereof; saturated or unsaturated halogenated fatty acids; and esters, amides and ammonium salts thereof; arylcarboxylic acids, and esters, amides and ammonium salts thereof; halogenated arylcarboxylic acids, and esters, amides and ammonium salts thereof; thioalcohols; thiocarboxylic acids, and esters, amides and ammonium salts thereof; and carboxylic acid esters of thioalcohol. These materials can be used alone or in combination.

It is preferable that the number of carbon atoms of the above-mentioned low-molecular-weight material be in the range of 10 to 60, more preferably in the range of 10 to 38, further preferably in the range of 10 to 30. Part of the alcohol groups in the esters may be saturated or unsaturated, and further may be substituted by halogen. In any case, it is preferable that the organic low-molecular-weight material have at least one atom selected from the group consisting of oxygen, nitrogen, sulfur and halogen in its molecule. More specifically, it is preferable the organic low-molecular-weight materials comprise, for instance, —OH, —COOH, —CONH, —COOR, —NH, —NH$_2$, —S—, —S—S—, —O— or a halogen atom.

Specific example of the above-mentioned organic low-molecular-weight materials include higher fatty acids such as lauric acid, dodecanoic acid, myristic acid, pentadecanoic acid, palmitic acid, stearic acid, behenic acid, nonadecanoic acid, arachic acid, oleic acid, lignoceric acid, cerotic acid, montanic acid, melissic acid, eicosanedioic acid, pentatriacontanoic acid, hexatriacontanoic acid, heptatriacontanoic acid, octatriacontanoic acid, hexatetracontanoic acid; esters of higher fatty acids such as methyl stearate, tetradecyl stearate, octadecyl stearate, octadecyl laurate, tetradecyl palmitate and dodecyl behenate; and the following ethers or thioethers:

$C_{16}H_{33}$—O—$C_{16}H_{33}$, $C_{16}H_{33}$—S—$C_{16}H_{33}$, $C_{18}H_{37}$—S—$C_{18}H_{37}$, $C_{12}H_{25}$—S—$C_{12}H_{25}$,

Of these, higher fatty acids having 16 or more carbon atoms, more preferably having 16 to 24 carbon atoms, such as palmitic acid, stearic acid, behenic acid and lignoceric acid are preferred in the present invention.

To widen the range of the temperature where the recording material can assume a transparent state, it is preferable to use the aforementioned organic low-molecular-weight materials in combination, or use the organic low-molecular-weight material in combination with the other material having a different melting point. Such materials having a different melting point are disclosed, for example, in Japanese Laid-Open Patent Applications 63-39378, 63-130380, 2-1363, and 3-2089, and Japanese Patent Applications 63-14754, and 1-140109.

It is preferable that the ratio by weight of the organic low-molecular-weight material to the matrix resin be in the range of about (2:1) to (1:16), more preferably in the range of (1:2) to (1:6) in the reversible thermosensitive recording layer. When the ratio of the low-molecular-weight material to the matrix resin is within the above range, the matrix resin can form a film in which the organic low-molecular-weight material is uniformly dispersed in the form of finely-divided particles, and the obtained recording layer can readily reach the maximum white opaque state.

It is preferable that the reversible thermosensitive recording layer have a thickness of 1 to 30 $\mu$m, more preferably a thickness of 2 to 20 $\mu$m, in order to make the temperature distribution of the reversible thermosensitive recording layer uniform, and to obtain a uniform transparent state and a white opaque state with high contrast. The degree of the white opaqueness can be increased by increasing the amount of the organic low-molecular-weight material in the thermosensitive recording layer.

In the reversible thermosensitive recording layer for use in the present invention, additives such as a surface-active agent and a high-boiling point solvent can be employed to facilitate the formation of a transparent image.

Examples of the high-boiling point solvent are tributyl phosphate, tri-2-ethylhexyl phosphate, triphenyl phosphate, tricresyl phosphate, butyl oleate, dimethyl phthalate, diethyl phthalate, dibutyl phthalate, diheptyl phthalate, di-n-octyl phthalate, di-2-ethylhexyl phthalate, diisononyl phthalate, dioctyldecyl phthalate, diisodecyl phthalate, butylbenzyl phthalate, dibutyl adipate, di-n-hexyl adipate, di-2-ethylhexyl adipate, di-2-ethylhexyl azelate, dibutyl sebacate, di-2-ethylhexyl sebacate, diethylene glycol dibenzoate, triethylene glycol, di-2-ethyl butyrate, methyl acetylricinoleate, butyl acetylricinoleate, butylphthalyl butyl glycolate and tributyl acetylcitrate.

Examples of the surface-active agent are polyhydric alcohol higher fatty acid esters; polyhydric alcohol higher alkyl ethers; lower olefin oxide adducts of polyhydric alcohol higher fatty acid ester, higher alcohol, higher alkylphenol, higher alkylamine of higher fatty acid, amides of higher fatty acid, fat and oil and polypropylene glycol; acetylene glycol; sodium, calcium, barium and magnesium salts of higher alkyl benzenesulfonic acid; calcium, barium and magnesium salts of higher fatty acid, aromatic carboxylic acid, higher aliphatic sulfonic acid, aromatic sulfonic acid, sulfuric monoester, phosphoric monoester and phosphoric diester; lower sulfated oil; long-chain polyalkyl acrylate; acrylic oligomer; long-chain polyalkyl methacrylate; long-chain alkyl methacrylate—amine-containing monomer copolymer; styrene—maleic anhydride copolymer; and olefin—maleic anhydride copolymer.

Some resins, when used as a matrix resin, have low adhesive strength to the support which is made of plastic film, glass, or metal. In such a case, an adhesive layer comprising a resin can be interposed between the support and the reversible thermosensitive recording layer to prevent the recording layer from peeling off the support.

The resin for the adhesive layer can be appropriately selected from any materials with excellent adhesive strength to the support, if it does not have adverse effects on the components of the reversible thermosensitive recording layer coating liquid. Examples of the resin for the adhesive layer include vinyl chloride-based resins, polyester-based resins, acryl-based resins, and polyamide-based resins. It is preferable to employ copolymers consisting essentially of vinyl chloride and phospate ester as the resin for the adhesive layer. It is also preferable that the adhesive layer have a thickness in the range of about 0.1 μm to 5 μm, more preferably in the range of about 0.3 μm to 2 μm.

In the present invention, when the image formed on the reversible thermosensitive recording material is observed as a reflection type image, a light reflection layer may be formed behind the recording layer to improve the contrast of the image even if the thickness of the recording layer is made thin. Specifically, the light reflection layer can be prepared by deposition of, for example, aluminum, nickel or tin on back side of the support opposite to the recording layer as described in Japanese Laid-Open Patent Application 64-14079.

Moreover, a card-type recording material can be prepared by combining a magnetic recording layer and the reversible thermosensitive recording layer which is described in Japanese Laid-Open Utility Model Application 2-3876. In the case where the reversible thermosensitive recording layer is formed over the magnetic layer, a smoothness-imparting layer may be formed on the magnetic layer to impart smoothness to the surface of the magnetic recording layer, and a light reflection layer and the reversible thermosensitive recording layer can be successively overlaid the magnetic layer. If necessary, an adhesive layer may be interposed between the reversible thermosensitive recording layer and the light reflection layer.

A protective layer may be formed on the reversible thermosensitive recording layer in order to prevent the thermosensitive recording layer from being deformed by the heat and pressure applied by a thermal head and from the the transparency of the transparent portion thereof being decreased by such deformation. It is preferable that the protective layer have a thickness of 0.1 μm to 5 μm. As the material for the protective layer, silicone rubber, silicone resin (described in Japanese Laid-Open Patent Application 63-221087), polysiloxane graft polymer (described Japanese Laid-Open Patent Application 63-317385), ultraviolet-curing resin and electron radiation curing resin (described in Japanese Laid-Open Patent Application 2-566) can be employed. In any case, the material for the protective layer is dissolved in a solvent to prepare a coating liquid and the thus prepared coating liquid is coated on the thermosensitive recording layer. Thus it is desirable that the resin and the organic low-molecular-weight material for use in the thermosensitive recording layer be not easily dissolved in such a solvent for use in the protective layer.

Examples of the above-mentioned solvent in which the resin and the organic low-molecular-weight material for use in the thermosensitive recording layer are not easily dissolved include n-hexane, methyl alcohol, ethyl alcohol and isopropyl alcohol. In particular, alcohol-based solvents are preferred from the viewpoint of the cost.

Further, an intermediate layer can be interposed between the protective layer and the thermosensitive recording layer to protect the thermosensitive recording layer from the solvent or a monomer component for the protective layer formation liquid (Japanese Laid-Open Patent Application 1-133781).

Examples of the resin for use in the formation of the intermediate layer include the resins used as the matrix resin for the thermosensitive recording layer, and the following thermosetting resins and thermoplastic resins: polyethylene, polypropylene, polystyrene, polyvinyl alcohol, polyvinyl butyral, polyurethane, saturated polyester, unsaturated polyester, epoxy resin, phenolic resin, polycarbonate, and polyamide.

It is preferable that the intermediate layer have a thickness of about 0.1 μm to 2 μm to obtain an appropriate protection effect and not to reduce the thermosensitivity of the thermosensitive recording layer.

Furthermore, a layer with low refractive index, such as an an air layer, can be interposed between the reversible thermosensitive recording layer and the support and/or between the reversible thermosensitive recording layer and the light reflection layer to improve the image contrast of the recording material.

Other features of this invention will become apparent in the course of the following description of exemplary embodiments which are given for illustration of the invention and are not intended to be limiting thereof.

EXAMPLE 1

Formation of Magnetic Recording Layer

The following components were mixed to prepare a magnetic recording layer coating liquid:

|  | Parts by Weight |
| --- | --- |
| γ-$Fe_2O_3$ | 10 |
| Vinyl chloride-vinyl acetate copolymer (Trademark "VAGH", made by Union Carbide Japan K.K.) | 10 |
| 50% toluene solution of isocyanate (Trademark "Coronate L", made by Nippon Polyurethane Industry Co., Ltd.) | 2 |
| Methyl ethyl ketone | 40 |
| Toluene | 40 |

The thus obtained magnetic recording layer coating liquid was coated on a white polyethylene telepthalate (PET) film with a thickness of about 188 μm, serving as a support, by a wire bar and dried under the application of heat thereto, so that a magnetic recording layer with a thickness of about 10 μm was formed on the support.

Preparation of Smoothness-Imparting Layer

The following components were mixed to prepare a smoothness-imparting layer coating liquid:

|  | Parts by Weight |
| --- | --- |
| 49% butyl acetate solution of special acryl-based ultraviolet-curing resin (Trademark "Unidic C7-164", made by Dainippon Ink & Chemicals, Incorporated) | 10 |
| Toluene | 4 |

The above prepared smoothness-imparting layer coating liquid was coated on the magnetic recording layer by a wire bar, dried under the application of heat thereto and cured by using an ultraviolet lamp of 80 W/cm for 5 sec, so that a smoothness-imparting layer with a thickness of about 1.5 μm was formed on the magnetic recording layer.

Preparation of Light Reflection Layer

Aluminum was vacuum-deposited on the smoothness-imparting layer, so that a light reflection layer with a thickness of about 400 Å was formed on the smoothness-imparting layer.

Preparation of Adhesive Layer

The following components were mixed to prepare an adhesive layer coating liquid:

|  | Parts by Weight |
|---|---|
| Vinyl chloride-vinyl acetate-phosphoric acid ester copolymer (Trademark "Denka Vinyl #1000P", made by Denki Kagaku Kogyo K.K.) | 10 |
| Tetrahydrofuran | 90 |

The above prepared adhesive layer coating liquid was coated on the light reflection layer by a wire bar and dried under the application of heat thereto, so that an adhesive layer with a thickness of about 0.5 μm was prepared.

Preparation of Reversible Thermosensitive Recording Layer

The following components were mixed to prepare a reversible thermosensitive recording layer coating liquid:

|  | Parts by Weight |
|---|---|
| Palmitic acid | 2 |
| Stearic acid | 3 |
| Eicosanedioic acid | 5 |
| Diisodecyl phthalate | 3 |
| Vinyl chloride-vinyl acetate copolymer (mixing ratio: (90:10), Polymerization degree: 600, Trademark "Denka Vinyl #1000MT", made by Denki Kagaku Kogyo K.K.) | 39 |
| Tetrahydrofuran | 100 |
| Toluene | 65 |

The above prepared reversible thermosensitive recording layer coating liquid was coated on the adhesive layer by a wire bar and dried with the application of heat thereto, so that a reversible thermosensitive recording layer with a thickness of about 5 μm was formed on the adhesive layer.

Preparation of Intermediate Layer

The following components were mixed to prepare a intermediate layer coating liquid:

|  | Parts by Weight |
|---|---|
| Polyamide resin (Trademark "CM8000", made by Toray Industries Inc.) | 10 |

|  | Parts by Weight |
|---|---|
| Methanol | 90 |

The above prepared intermediate coating liquid was coated on the reversible thermosensitive recording layer by a wire bar and dried by the application of heat thereto, so that an intermediate layer with a thickness of about 1 μm was formed on the reversible thermosensitive recording layer.

Preparation of Protective Layer

The following components were mixed to prepare a protective layer coating liquid:

|  | Parts by Weight |
|---|---|
| 75% butyl acetate solution of urethane-acrylate ultraviolet-curing resin (Trademark "Unidic C7-157", made by Dainippon Ink & Chemicals, Incorporated) | 10 |
| Toluene | 10 |

The above prepared protective layer coating liquid was coated on the intermediate layer by a wire bar, dried by the application of heat thereto, and cured using an ultraviolet lamp of 80 W/cm, so that a protective layer with a thickness of about 2 μm was formed on the intermediate layer, whereby a reversible thermosensitive recording material No. 1 according to the present invention was prepared.

EXAMPLES 2 to 22

The procedure for preparation of the reversible thermosensitive recording material No. 1 in Example 1 was repeated except that the vinyl chloride—vinyl acetate copolymer ("Denka Vinyl #1000MT" (Trademark), made by Denki Kagaku Kogyo K.K.) employed in Example 1 was replaced by the respective resins shown in Table 1, whereby reversible thermosensitive recording materials No. 2 to No. 22 according to the present invention were prepared.

COMPARATIVE EXAMPLES 1 to 12

The procedure for preparation of the reversible thermosensitive recording material in Example 1 was repeated except that the vinyl chloride—vinyl acetate copolymer ("Denka Vinyl #1000MT" (Trademark), made by Denki Kagaku Kogyo K.K.) employed in Example 1 was replaced by the respective resins shown in Table 1, whereby comparative reversible thermosensitive recording materials No. 1 to No. 12 were prepared.

The following Table 1 shows the composition and properties of each of the resins employed in Examples 1 to 22 and Comparative Examples 1 to 12:

TABLE 1

|  | Composition Vinyl Chloride/ Vinyl Acetate/ Other | Number Average Molecular Weight (Mn) | Weight Average Molecular Weight (Mw) | Poly-dispersity Index (Mw/Mn) | Average Polymerization Degree (X) | Trademark & Manufacturer |
|---|---|---|---|---|---|---|
| Ex. 1 | 90/10 | 41000 | 88000 | 2.17 | 642 | "Denka Vinyl #10000MT", made by Denki Kagaku Kogyo K.K |
| Ex. 2 | 82/18 | 51000 | 110000 | 2.18 | 789 | "Denka Vinyl #1000MT$_2$", |

TABLE 1-continued

| | Composition Vinyl Chloride/ Vinyl Acetate/ Other | Number Average Molecular Weight (Mn) | Weight Average Molecular Weight (Mw) | Poly-dispersity Index (Mw/Mn) | Average Polymerization Degree (X) | Trademark & Manufacturer |
|---|---|---|---|---|---|---|
| | | | | | | made by Denki Kagaku Kogyo K.K |
| Ex. 3 | 95/5 | 44000 | 102000 | 2.32 | 693 | "M-1007", made by Kanegafuchi Chemical Industry Co., Ltd. |
| Ex. 4 | 95/5 | 49000 | 109000 | 2.21 | 772 | "M-1008", made by Kanegafuchi Chemical Industry Co., Ltd. |
| Ex. 5 | 95/5 | 51000 | 116000 | 2.27 | 804 | "20-1488" (prototype), made by Kanegafuchi Chemical Industry Co., Ltd. |
| Ex. 6 | 95/5 | 63000 | 148000 | 2.34 | 993 | "20-1489" (prototype), made by Kanegafuchi Chemical Industry Co., Ltd. |
| Ex. 7 | 95/5 | 83000 | 191000 | 2.30 | 1308 | "20-1502" (prototype), made by Kanegafuchi Chemical Industry Co., Ltd. |
| Ex. 8 | 93/7 | 49000 | 112000 | 2.28 | 770 | "MA-1008", made by Kanegafuchi Chemical Industry Co., Ltd. |
| Ex. 9 | 90/10 | 44000 | 99000 | 2.26 | 688 | "MB-1008", made by Kanegafuchi Chemical Industry Co., Ltd. |
| Ex. 10 | 80/20 | 46000 | 102000 | 2.25 | 710 | "20-1492" (prototype), made by Kanegafuchi Chemical Industry Co., Ltd. |
| Ex. 11 | 80/20 | 52000 | 120000 | 2.31 | 802 | "20-1490" (prototype), made by Kanegafuchi Chemical Industry Co., Ltd. |
| Ex. 12 | 80/20 | 59000 | 136000 | 2.32 | 910 | "20-1491" (prototype), made by Kanegafuchi Chemical Industry Co., Ltd. |
| Ex. 13 | 80/20 | 72000 | 161000 | 2.24 | 1111 | "20-1500" (prototype), made by Kanegafuchi Chemical Industry Co., Ltd. |
| Ex. 14 | 80/20 | 82000 | 197000 | 2.40 | 1265 | "20-1499" (prototype), made by Kanegafuchi Chemical Industry Co., Ltd. |
| Ex. 15 | 80/20 | 85000 | 185000 | 2.20 | 1312 | "20-1501" (prototype), made by Kanegafuchi Chemical Industry Co., Ltd. |
| Ex. 16 | 70/30 | 53000 | 118000 | 2.26 | 807 | "20-1504" (prototype), made by Kanegafuchi Chemical Industry Co., Ltd. |
| Ex. 17 | 70/30 | 60000 | 135000 | 2.27 | 913 | "20-1509" (prototype), made by Kanegafuchi Chemical Industry Co., Ltd. |
| Ex. 18 | 70/30 | 72000 | 169000 | 2.35 | 1096 | "20-1505" (prototype), made by Kanegafuchi Chemical Industry Co., Ltd. |
| Ex. 19 | 70/30 | 87000 | 200000 | 2.31 | 1324 | "20-1507" (prototype), made by Kanegafuchi Chemical Industry Co., Ltd. |
| Ex. 20 | 100/0 | 30000 | 65000 | 2.17 | 479 | "S400", made by Kanegafuchi Chemical Industry Co., Ltd. |
| Ex. 21 | 100/0 | 44000 | 102000 | 2.32 | 700 | "S1007", made by Kanegafuchi Chemical Industry Co., Ltd. |
| Ex. 22 | 100/0 | 62000 | 139000 | 2.26 | 984 | "S1001", made by Kanegafuchi Chemical Industry Co., Ltd. |
| Comp. Ex. 1 | 100/0 | 81000 | 185000 | 2.27 | 1300 | "S1003", made by Kanegafuchi Chemical Industry Co., Ltd. |
| Comp. Ex. 2 | 100/0 | 107000 | 246000 | 2.30 | 1700 | "KS1700", made by Kanegafuchi Chemical Industry Co., Ltd. |
| Comp. Ex. 3 | 95/5 | 101000 | 236000 | 2.33 | 1592 | "20-1503" (prototype), made by Kanegafuchi Chemical Industry Co., Ltd. |
| Comp. Ex. 4 | 95/5 | 126000 | 278000 | 2.19 | 1986 | "20-1506" (prototype), made by Kanegafuchi Chemical Industry Co., Ltd. |
| Comp. Ex. 5 | 86/14 | 25000 | 57000 | 2.28 | 389 | "Denka Vinyl #1000A", made by Denki Kagaku Kogyo K.K. |
| Comp. | 84/15/1 | 22000 | 52000 | 2.40 | 344 | "Denka Vinyl #1000P", |

TABLE 1-continued

| | Composition Vinyl Chloride/ Vinyl Acetate/ Other | Number Average Molecular Weight (Mn) | Weight Average Molecular Weight (Mw) | Polydispersity Index (Mw/Mn) | Average Polymerization Degree (X) | Trademark & Manufacturer |
|---|---|---|---|---|---|---|
| Ex. 6 | (phosphoric acid ester) | | | | | made by Denki Kagaku Kogyo K.K. |
| Comp. Ex. 7 | 80/20 | 27000 | 63000 | 2.30 | 417 | "20-1497" (prototype), made by Kanegafuchi Chemical Industry Co., Ltd. |
| Comp. Ex. 8 | 80/0/20 (vinylidene chloride) | 30000 | 66000 | 2.19 | 429 | "Denka Vinyl #1000W", made by Denki Kagaku Kogyo K.K. |
| Comp. Ex. 9 | 70/30 | 32000 | 79000 | 2.39 | 487 | "20-1510" (prototype), made by Kanegafuchi Chemical Industry Co., Ltd. |
| Comp. Ex. 10 | 70/30 | 44000 | 102000 | 2.32 | 670 | "20-1508" (prototype), made by Kanegafuchi Chemical Industry Co., Ltd. |
| Comp. Ex. 11 | 83/16/1 (maleic acid) | 23000 | 43000 | 1.86 | 282 | "VMCC", made by Union Carbide Japan K.K. |
| Comp. Ex. 12 | 90/4/6 (polyvinyl alcohol) | 31000 | 62000 | 1.98 | 498 | "VAGH", made by Union Carbide Japan K.K. |

In the above Table 1, the polydispersity index means the ratio ($\overline{Mw}/\overline{Mn}$) of the weight average molecular weight ($\overline{Mw}$) to the number average molecular weight ($\overline{Mn}$), and indicates the polydispersibility of the polymer composition, namely the width of the molecular weight distribution in the polymer composition. When the polydispersity index is 1, the polymer composition consists of polymers with the same molecular weight. When the polydispersity index is more than 1, the polymer composition consists of polymers with different molecular weights. The larger the polydispersity index, the greater the number of the polymers with different molecular weight in the polymer composition. Generally the polydispersity index is in the range of 1.5 to 3.0 as shown in Table 1.

As mentioned previously, the average polymerization of each resin was calculated from the number average molecular weight ($\overline{Mn}$).

Specific conditions for measuring the number average molecular weight ($\overline{Mn}$) were as follows:

Pretreatment

A sample resin is dissolved in tetrahydrofuran (THF) with a concentration of about 0.2 (wt./vol. %), and the solution was filtered through a 0.45 μm fluoro pore filter to obtain a filtrate. This filtrate was used as a test sample.

Measurement conditions for GPC (Gel Penetration Chromatography)

| Apparatus: | Waters Liquid Chromatography SIC Labo Chart 180 |
|---|---|
| Column: | Shodex K-80M |
| Amount of Sample: | 80 μl |
| Eluent: | THF |
| Flow Rate: | 1.0 ml/min |
| Detector: | RI (Differential Refractometer) |

Calibration

A polystyrene-reference molecular weight calibration curve was employed.

Each of the reversible thermosensitive recording materials prepared in Examples 1 to 22 and Comparative Examples 1 to 12 was subjected to an image formation test with the application of thermal energy by a thermal head with 8 dots/mm under the following conditions, whereby a milky white opaque image was formed in each reversible thermosensitive recording material:

Applied voltage: 12.0 volts
Applied pulse width: 1 msec.

The thus formed milky white opaque image was then erased by the thermal head to make the milky white opaque image transparent portion under the following conditions:

Applied voltage: 10.0 volts
Applied pulse width: 1 msec.

The above image formation and erasing operation was repeated 150 times.

The initial density of the milky white opaque image and the density of the milky white opaque image at the 150th image formation and erasing operation were measured, and the difference between the initial density of the milky white opaque image, and the density of the milky white opaque image at the 150th image formation and erasing operation was calculated with respect to each of the reversible thermosensitive recording media. The results are shown in Table 2. Table 2 also shows the overall evaluation of each of the above tested reversible thermosensitive recording media.

TABLE 2

| | Durability of Reversible Thermosensitive Recording Material | | | |
|---|---|---|---|---|
| | White Opaque Density at 1st Image Formation | White Opaque Density at 150th Image Formation | Difference in White Opaque Density between 1st Image Formation and 150th Image Formation | Overall Evaluation |
| Ex. 1 | 0.55 | 0.70 | 0.15 | ○ |
| Ex. 2 | 0.50 | 0.69 | 0.19 | ○ |
| Ex. 3 | 0.62 | 0.72 | 0.10 | ○ |
| Ex. 4 | 0.62 | 0.73 | 0.11 | ○ |
| Ex. 5 | 0.63 | 0.73 | 0.10 | ○ |
| Ex. 6 | 0.65 | 0.74 | 0.09 | ○ |
| Ex. 7 | 0.78 | 0.84 | 0.06 | △ |
| Ex. 8 | 0.62 | 0.69 | 0.07 | ○ |
| Ex. 9 | 0.57 | 0.62 | 0.05 | ○ |
| Ex. 10 | 0.53 | 0.82 | 0.29 | ○ |
| Ex. 11 | 0.55 | 0.83 | 0.28 | ○ |
| Ex. 12 | 0.54 | 0.72 | 0.18 | ○ |
| Ex. 13 | 0.56 | 0.78 | 0.22 | ○ |

TABLE 2-continued

| | Durability of Reversible Thermosensitive Recording Material | | | |
|---|---|---|---|---|
| | White Opaque Density at 1st Image Formation | White Opaque Density at 150th Image Formation | Difference in White Opaque Density between 1st Image Formation and 150th Image Formation | Overall Evaluation |
| Ex. 14 | 0.52 | 0.68 | 0.16 | ○ |
| Ex. 15 | 0.55 | 0.60 | 0.05 | ○ |
| Ex. 16 | 0.51 | 0.99 | 0.48 | ▽ |
| Ex. 17 | 0.51 | 0.92 | 0.41 | ▽ |
| Ex. 18 | 0.51 | 0.74 | 0.23 | ○ |
| Ex. 19 | 0.53 | 0.65 | 0.12 | ○ |
| Ex. 20 | 0.62 | 0.83 | 0.21 | ○ |
| Ex. 21 | 0.61 | 0.75 | 0.14 | ○ |
| Ex. 22 | 0.86 | 0.97 | 0.11 | △ |
| Comp. Ex. 1 | 1.20 | — | — | |
| Comp. Ex. 2 | 1.46 | — | — | ▲ |
| Comp. Ex. 3 | 1.35 | — | — | ▲ |
| Comp. Ex. 4 | 1.74 | — | — | ▲ |
| Comp. Ex. 5 | 0.52 | 1.27 | 0.75 | ▲ |
| Comp. Ex. 6 | 0.53 | 1.38 | 0.85 | ▲ |
| Comp. Ex. 7 | 0.49 | 1.42 | 0.93 | ▲ |
| Comp. Ex. 8 | 0.51 | 1.42 | 0.91 | ▲ |
| Comp. Ex. 9 | 0.48 | 1.58 | 1.10 | ▲ |
| Comp. Ex. 10 | 0.51 | 1.53 | 1.02 | ▲ |
| Comp. Ex. 11 | 0.50 | 1.40 | 0.90 | ▲ |
| Comp. Ex. 12 | 0.57 | 1.25 | 0.68 | ▲ |

In Table 2, "○" denotes that the initial density of the white opaque image is extremely high and the durability of the reversible thermosensitive recording medium is excellent; "△" denotes that the initial density of the white opaque image is high and the durability of the reversible thermosensitive recording medium is excellent; "▽" denotes that the initial density of the white opaque image is extremely high and the durability of the reversible thermosensitive recording medium is good; "▲" denotes that the initial density of the white opaque image is extremely low and the durability of the reversible thermosensitive recording medium cannot be measured; and "▲" denotes that the initial density of the white opaque image is extremely high, but the durability of the reversible thermosensitive recording medium is no good.

The reversible thermosensitive recording media with the initial white opaque density thereof being 1 or more were not subjected to the above image formation test of repeating the image formation and erasing operation.

FIG. 2 also shows the above-mentioned overall evaluation of each of the tested reversible thermosensitive recording media, using the same evaluation marks as in Table 2.

As can be seen from the results obtained by the above Examples and Comparative Examples, the white opaque density of the reversible thermosensitive recording medium according to the present invention is not lowered very much even by repeating the image formation and erasure by the simultaneous application of heat and pressure. This is because the reversible thermosensitive recording material according to the present invention comprises a matrix resin such as polyvinyl chloride or vinyl chloride with the following relationship between the repeat unit of the vinyl chloride (Y:- weight %) and the average polymerization degree (X):

$$-0.68 \log X + 3.794 \leq \log Y \leq -0.215 \log X + 2.66.$$

What is claimed is:

1. A reversible thermosensitive recording material comprising a support and a reversible thermosensitive recording layer formed thereon, which comprises:
   a matrix resin selected from the group consisting of polyvinyl chloride and vinyl chloride copolymer, and
   an organic low-molecular-weight material dispersed in the form of finely-divided particles in said matrix resin, with the weight percentage Y of the vinyl chloride repeat in said matrix resin and the average polymerization degree X of said matrix resin satisfying the relationship:

$$-0.68 \log X + 3.794 \leq \log Y \leq -0.215 \log X + 2.66.$$

2. The reversible thermosensitive recording material as claimed in claim 1, wherein said average polymerization degree X is 500 or more.

3. The reversible thermosensitive recording material as claimed in claim 1, further comprising a reflection layer which is provided on the back side of said support opposite to said reversible thermosensitive recording layer.

4. The reversible thermosensitive recording material as claimed in claim 1, further comprising an adhesive layer which is interposed between said support and said reversible thermosensitive recording layer.

5. The reversible thermosensitive recording material as claimed in claim 1, further comprising a magnetic recording layer which is between said support and said reversible thermosensitive recording layer.

6. The reversible thermosensitive recording material as claimed in claim 5, further comprising a smoothness-imparting layer, which is interposed between said magnetic recording layer and said reversible thermosensitive recording layer and imparts smoothness to the surface of said magnetic recording layer.

7. The reversible thermosensitive recording material as claimed in claim 1, further comprising a protective layer formed on said reversible thermosensitive recording layer.

8. The reversible thermosensitive recording material as claimed in claim 1, wherein said relationship is $$-0.215 \log X + 2.49 \leq \log Y \leq -0.215 \log X + 2.636.$$

* * * * *

UNITED STATES PATENT AND TRADEMARK OFFICE
CERTIFICATE OF CORRECTION

PATENT NO. : 5,283,220
DATED : FEBRUARY 1, 1994
INVENTOR(S) : MAKOTO KAWAGUCHI ET AL

It is certified that error appears in the above-identified patent and that said Letters Patent is hereby corrected as shown below:

Column 6, line 31, "temperature $T_2$ Even if" should read --temperature $T_2$. Even if--.

Column 11, line 31, "from the the transparency" should read --from the transparency--;
line 35, "{described in Japanese" should read --(described in Japanese--.

Column 19, Ex. 5 Comp, "▲" should read --▼--;
Ex. 6 Comp, "▲" should read --▼--;
Ex. 7 Comp, "▲" should read --▼--;
Ex. 8 Comp, "▲" should read --▼--;
Ex. 9 Comp, "▲" should read --▼--;
Ex. 10 Comp, "▲" should read --▼--.

UNITED STATES PATENT AND TRADEMARK OFFICE
CERTIFICATE OF CORRECTION

PATENT NO. : 5,283,220

DATED : FEBRUARY 1, 1994

INVENTOR(S) : MAKOTO KAWAGUCHI ET AL

It is certified that error appears in the above-identified patent and that said Letters Patent is hereby corrected as shown below:

Column 19, Ex. 11 Comp, "▲" should read --▼--;

Ex. 12 Comp, "▲" should read --▼--;

line 50 "▲" should read --▼--.

Signed and Sealed this

Twenty-first Day of February, 1995

Attest:

BRUCE LEHMAN

*Attesting Officer*     *Commissioner of Patents and Trademarks*